United States Patent [19]

Döring

[11] 4,425,098

[45] Jan. 10, 1984

[54] SOUND-ILLUSTRATED, BOUND BOOK

[76] Inventor: Erich Döring, Im Hölzli, 9442 Berneck, Switzerland

[21] Appl. No.: 407,941

[22] Filed: Aug. 13, 1982

[30] Foreign Application Priority Data

Aug. 21, 1981 [DE] Fed. Rep. of Germany ... 8124507[U]

[51] Int. Cl.³ .......................... G09B 5/06; B42D 1/00; G11B 23/44; G11B 25/04
[52] U.S. Cl. ...................................... 434/317; 281/38; 369/273
[58] Field of Search ....................... 434/317; 369/273; 281/38

[56] References Cited

U.S. PATENT DOCUMENTS

| 916,036 | 3/1909 | Scholes | 281/38 |
|---|---|---|---|
| 1,502,312 | 7/1924 | Mayhew | 369/273 |
| 2,309,244 | 1/1943 | Fey | 281/38 |
| 3,193,295 | 7/1965 | Isemura | 369/273 X |
| 3,321,208 | 5/1967 | Nicholson | 369/273 |
| 3,702,032 | 11/1972 | Doring | 434/317 |

FOREIGN PATENT DOCUMENTS

| 2155910 | 4/1973 | Fed. Rep. of Germany . | |
| 2001283 | 10/1973 | Fed. Rep. of Germany . | |
| 2430377 | 1/1976 | Fed. Rep. of Germany . | |
| 2358110 | 2/1977 | Fed. Rep. of Germany . | |
| 707781 | 4/1931 | France | 369/273 |
| 14-16159 | 8/1939 | Japan . | |
| 350118 | 12/1960 | Switzerland | 369/273 |
| 800996 | 9/1958 | United Kingdom | 40/2 |

Primary Examiner—William H. Grieb
Attorney, Agent, or Firm—Webb, Burden, Robinson & Webb

[57] ABSTRACT

A sound-illustrated, bound book includes sound record areas in the form of a spiral sound groove each associated with individual pages. Adjustment perforations or embossments or engravements and switch-on safety elements, if provided, for a sound reproducing apparatus attachable in aligned position, are associated with each sound groove. It is suggested to provide the sound grooves with the adjustment perforations and the switch-on safety elements on separate double pages of plastic material, at best being semi-rigid, and bound in the book, inserted into the quaternia thereof, in order to permit more favorable production of the individual book pages and of the sound groove carriers and to prevent any obstruction when the book is read with a sound reproducing apparatus having a revolving pickup placed on the sound groove and to avoid too much bulging of the book, especially toward one side. The sound grooves may be provided at the front and back sides of the sound record pages so as to be disposed directly opposite each other. The adjustment perforations or engravements and embossments as well as the switch-on safety elements may be arranged symmetrically with respect to two orthogonal central axes of the sound grooves such that they will be in common for the oppositely disposed sound grooves. The switch-on safety elements are embodied by an upwardly protruding embossment and a downwardly protruding engravement located close to the embossment.

18 Claims, 9 Drawing Figures

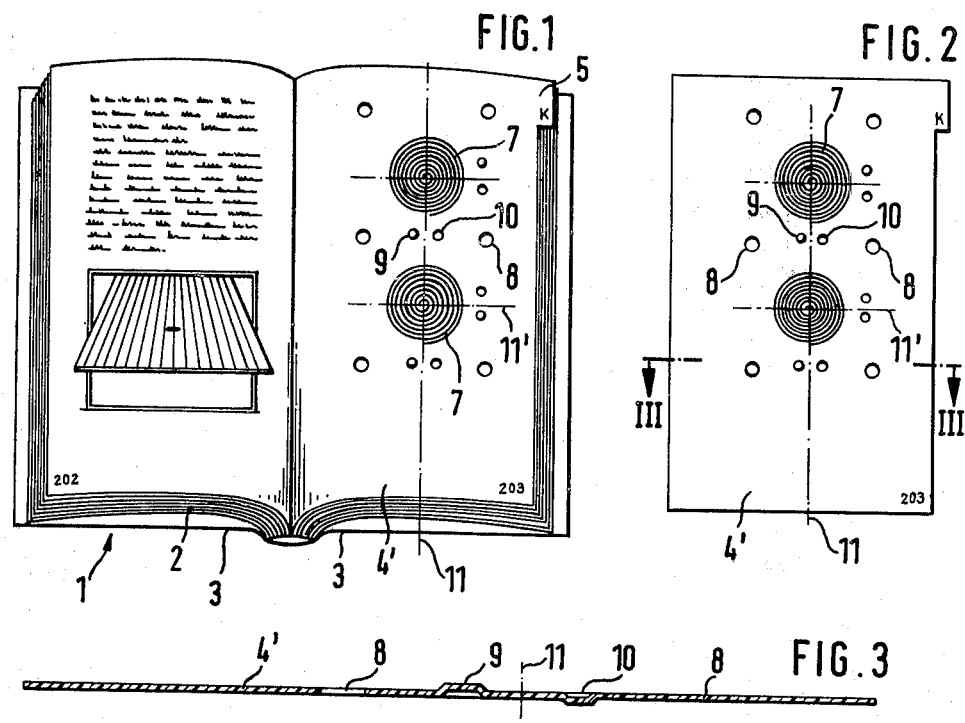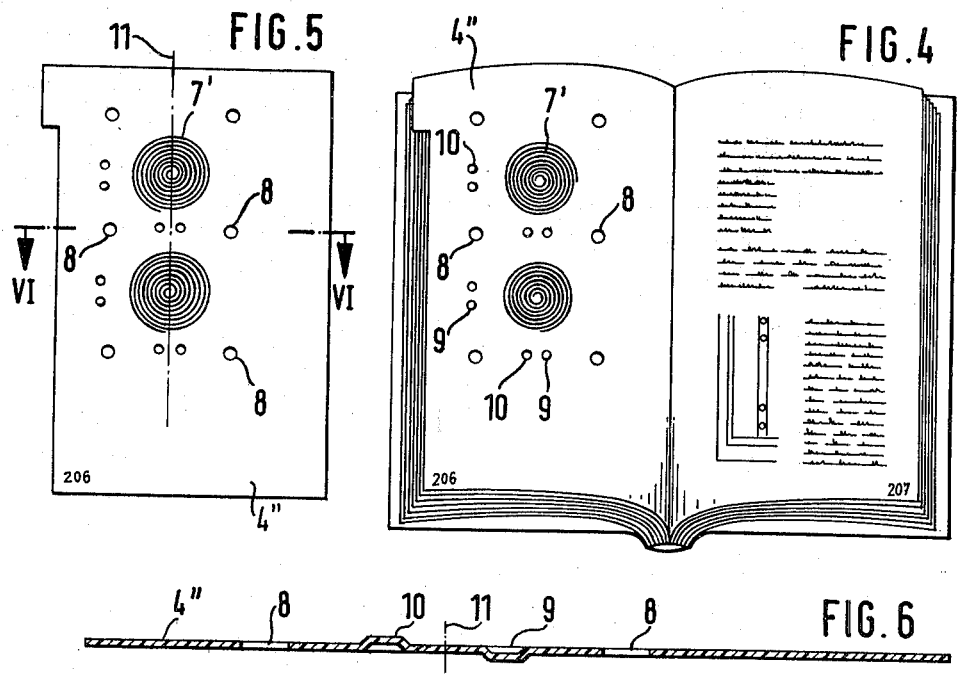

SOUND-ILLUSTRATED, BOUND BOOK

The invention relates to a sound-illustrated, bound book, comprising sound record areas in the form of a spiral sound groove each and associated with individual printed pages, and associated with the sound groove adjuster elements, and, possibly, switch-on safety elements for a sound reproducing apparatus attachable in aligned position for interaction with the elements mentioned by adjuster matching elements provided at its underside and, possibly, switch-on safety matching elements.

So-called sounding books or sound-illustrated books for children are known particularly for educational purposes, to teach languages, or as travel guides and the like. On individual pages these books have sound record areas in the form of individual spiral sound grooves which may be provided either by being impressed directly into the pages which are given a corresponding specific surface design, such as being laminated with a plastic film, or by being formed in separate sound recording media (acoustic foils) bonded to the pages. In teaching, especially self-teaching the visual illustrations or written information thus may be supplemented and emphasized by acoustic data of about 1–3 minutes duration contained in the sound groove. Sound grooves impressed in or glued on the text of a page of the book at a suitable location have the disadvantage of causing partial cover-up of the passages of the text to be illustrated, as seen from the part of the reader, by the sound reproducing apparatus attached. Even if no such apparatus is attached, the sound grooves are irritating because they disturb the clarity of the letters and images. This is true also if the sound grooves are located at the respective opposite sides of the two open pages of the book. In both cases it is a disadvantage of impressed sound grooves that the corresponding sound-illustrated page with printed text of the book must be produced separately from the other book pages. Acoustic foil bonded on the pages causes one-sided bulging. Bonding of the sound recording medium by the maker of the book forbids itself for price reasons.

It is known (German Pat. No. 23 58 110) to provide the sound grooves separately on pivotable, semi-rigid book pages so as to avoid the problem of coordination between the sound grooves and the text in the book itself as well as poor readability. This has the disadvantage that, as a rule, a book can be provided only at the left side or at the right side of a book jacket with a foil having impressed sound grooves and corresponding in size to a page of the book. The proportion of sound thus is low as compared to the text contained in the book.

Another known proposal was accepted still less in practice. It provided for a single sound groove on individual, semi-rigid pages of a copy-book so as to cover essentially the entire page. The individual pages are interconnected by a helical spring or the like to form a copy-book (British Pat. No. 800 996).

The sound grooves provided on book pages or book covers are played back by a small attachable sound reproducing apparatus including a circulating pickup head which follows the track of the sound, an amplifier, and a loud speaker as well as the necessary piles or a storage battery for energy supply. Correct coordination between the sound reproducing apparatus and the spiral sound groove can be obtained by surrounding the sound groove with a protruding guide groove or projecting abutments forming stops and acting as adjuster elements for engagement with the sound reproducing apparatus, the casing of which is provided with a downwardly protruding annular socket to act as an adjuster matching element so as to obtain centering with respect to the sound groove (Japanese Pat. No. 436 403/sho 39-16 159). In another known embodiment of the sound record consisting of an acoustic foil bonded to the book pages and including a spiral sound track, two adjustment perforations are provided at the edge outside of the area taken up by the sound groove to act as adjuster elements for centering. In this case the sound reproducing apparatus includes two feet at its underside to serve as adjuster matching elements for engagement in the perforations upon correct association (German Pat. No. 20 01 283).

When the sound reproducing apparatus has been aligned properly above the sound groove of a book page it is switched on by actuating a switch normally provided at its upper side. Thereupon the pickup of the apparatus is lowered automatically from its retracted position to scan the sound record. When the tracking of the sound groove has been completed, the apparatus may be switched off automatically just like an ordinary record player, and this will return the pickup automatically into its retracted starting position.

It is a disadvantage of such attachable sound reproducing apparatus having a revolving pickup that they may be switched on especially by children long before they have reached their proper position above the sound groove. This may cause the very sensitive pickup stylus to contact surfaces of tables, book pages, edges of sound records, and the like and, thereby, suffer damage. The risk is the same if engagement is established with difficulty only between the adjustment means of the sound record and the matching adjustment means of the sound reproducing apparatus so that the apparatus will be turned on easily even before it has been associated properly with the sound groove.

It is known to eliminate this disadvantage by providing the sound record outside of the sound groove with switch-on safety elements which must be sensed and, perhaps, pivoted by sensor pins of the sound reproducing element acting as switch-on safety matching elements before the circuit can be closed to drive the pickup arm turntable with the pickup arm. The sound reproducing apparatus may comprise conductive sensor pins bridged by an electrically conductive coating in the form of a contact film (German application print 21 55 910) disposed in proper position on the sound record. In this manner the sound reproducing apparatus cannot be switched on or the pickup cannot be moved into its operating position unless the sound reproducing apparatus has been attached in correct alignment.

In another known embodiment of a sound reproducing apparatus including a switch-on safety means (German patent application laid open 24 30 377) the closing contact is located in the reproducing apparatus and it is matched in height with the switching and sensing pin such that it cannot be closed unless the point of the sensing pin is positioned above the plane of attachment of the reproducing apparatus. To this end an upwardly protruding embossment (wart) is formed in the sound record, and the association in height between the closing contact and the sensing pin is such that the contact is closed only when the sensing pin rests on the embossment. It is known that the switch-on safety of this means can be enhanced still further by forming next to the embossment an aperture, such as a hole and by providing another sensing pin resiliently supported in height in the reproducing apparatus. This sensing pin must extend through the aperture down to the sound recording substrate in order to close the closing contact. If two sensing pins are provided, they must be at different levels so as to permit closing of the operating circuit. The or each sensing pin, in general, will not be able to adopt its desired position unless the sound reproducing apparatus rests in proper alignment on the sound record or on the book page rather than, for instance, being placed directly on a flat book page or table top.

The provision of switch-on safety elements at the sound record has proved to be practically just as necessary for substantially eliminating the risk of damaging the pickup head as the provision of adjustment perforations or other means, such as raised grooves, stampings, and the like to achieve properly aligned coordination.

Considerable technical manufacturing difficulties are encountered and substantial extra expenditure is required to form book pages with sound grooves because not only the manufacture but also the material of the book pages must be suitable for making the sound grooves. Furthermore, the arrangement of the sound grooves must be made in consideration of the arrangement of the text on the pages and of the playback by means of the attachable sound reproducing apparatus. The whole make-up of the book thus becomes difficult. In addition, raised adjusting means cannot be distributed at will across the book page because that would entail one-sided thicker portions of the book. Furthermore, in consideration of the readability of the text, it is impossible to cover the entire book page with sound grooves.

For this reason a sound-illustrated book having bound pages normally was produced such that individual sound records consisting of transparent plastic material and having at their underside a self-adhesive coating covered by a protective film to be peeled off, were made separately from the book and later on glued into the book by the purchaser. Generally the sound record may not be made of opaque plastics because in that event it could be glued only on larger sections without any text.

It is the object of the invention that a sound-illustrated book, having sound grooves, impressed in a separately producible acoustic foil, associated with passages of the text on the individual pages for illustration thereof and adapted to be played back by means of an attachable sound reproducing apparatus, the feet or bottom of which are inserted in corresponding perforations of the acoustic foil or placed between impressed formations, and which preferably cooperates by switch-on safety means, particularly resiliently supported sensing or switching pins located in the switch-on circuit, with raised or depressed formations, should be modified such that more advantageous, and less expensive complete manufacture by the publishers or book manufacturers is permitted and no completion by the purchaser is required, and that the book as a whole becomes thinner, but not at the expense of the sonic quality because of the use of thinner acoustic foils. Tracking of the sound grooves is to be permitted without any coverage or obstruction of view caused by the sound reproducing apparatus.

This object is met, in accordance with the invention, the sound-illustrated, bound or sewed book comprising sound record areas in the form of a spiral sound groove each and associated with individual printed pages, and associated with the sound groove adjuster elements, and, possibly, switch-on safety elements for a sound reproducing apparatus attachable in aligned position for interaction with the elements mentioned by adjuster matching elements provided at its underside and, possibly, switch-on safety matching elements, in that the sound grooves with the adjuster elements, and switch-on safety elements, if provided, are provided on separate sound record double pages of plastic material bound in the book and inserted into the quaternia thereof (folded printed sheets for, e.g. 8 leaves having 16 pages) and the adjuster elements, and the switch-on safety elements, if provided, are arranged symmetrically with respect to a central axis of the sound grooves.

The complete separation between the production of the book pages and the production of the sound record pages makes it possible to select for each of these manufactures the most favorable conditions, regardless of the other. When binding the book, the semi-rigid double pages of acoustic sheeting including the impressed sound grooves are inserted at the desired locations and bound into the book. The sound record pages may be turned over like any other page of the book. Books not containing sound-illustrations so far may be issued practically for the first time as fully sound-illustrated books when publishing a new edition, by inserting the sound record double pages in the quaternia. The sound record double pages included in the binding have the additional advantage that sound grooves may be provided at both sides of the sound record such that they are directly opposite each other, having the same center, and that the adjuster elements as well as the switch-on safety elements are located in such positions as to be shared by the oppositely disposed sound grooves. Consequently twice the amount of audio information can be furnished as compared to a sound record page having sound grooves on one side only, at the same thickness. Therefore, the book becomes less thick.

Of course, it is also possible to provide sound grooves at one side only if sound-illustration is desired with respect to one book page only. This will be the case in particular with pages bound near the beginning and the end of the book because only that book page can be placed in sufficiently flat position for playback which has the greatest number of book pages underneath. If sound record pages are provided with sound grooves on both sides, it is possible to find the sound-illustration of a book page on the opposite sound record page and vice versa.

Neither the image nor the text of the book pages are disturbed by the attached sound reproducing apparatus or by the sound grooves. Arranging the adjuster elements and the switch-on safety elements symmetrically with respect to orthogonal central axes, preferably at both sides of the sound groove area facilitates perfect attachment of the sound reproducing apparatus. If the sound record double pages are located close to either one of the two book covers and the arching of the pages becomes very pronounced in the one quire, in this manner the sound reproducing apparatus may be attached such that the switch-on safety elements are close to the lateral margin so as to extend approximately parallel to the side edge and thus not be influenced by any arching. As the playback of sound records in books is not altogether unproblematic because of the curvature of the open book, the sound grooves should be as far outside as possible, away from the back of the book because the arching is greater near the back.

None of the sound grooves impressed disturbs one or the other side. The simpler manufacture is advantageous because all sound grooves for adjacent book pages may be combined on one piece of sheeting or foil so that they may be formed in a single process of impression without disrupting the coordination. The acoustic sheetings for two sound grooves to be arranged opposite each other may be thinner not only because sound grooves are provided at both sides but also because the adjustment perforations as well as the switch-on safety elements are shared by the two superposed sound groove areas. The perforations of the sound groove pages or sound sheetings thus are used from both sides. The same applies to the switch-on safety elements.

It is provided in a modification of the invention that the switch-on safety elements are embodied by an upwardly protruding embossment and a downwardly protruding engravement close to the embossment, and that these are shared by the two sound grooves oppositely disposed on the top and back side of a page of the sound record double page. Every upwardly protruding embossment of the sound sheeting effects a downwardly protruding engravement or setback at the opposite side. Therefore, to obtain a certain switch-on safety means which requires a certain difference in level of the two safety sensing pins of the sound reproducing apparatus, the sound record pages are thinner because the elevations and depressions (upon turning over) can be used in common for both sides (sound grooves).

Impressing sound grooves in both sides of the acoustic foil makes it necessary to position the sound grooves exactly opposite each other on the top and back side of each page of a sound record double page, as is the case with an ordinary record. Then, however, the adjustment perforations and the impressed formations are disposed symmetrically with respect to each other, and this has the consequence that no further thickenings are caused. The switch-on safety elements need not necessarily be of the embodiment indicated. According to a modification of the invention, for instance, the switch-on safety elements on the acoustic foil are embodied by an impressed microprism area, especially one having a narrow reflection profile oriented in a certain direction and adapted to be scanned photoelectrically, particularly by means of a light reflection barrier. Such a microprism area may be imprinted in plastic film material just like the sound grooves. As it does not add to the thickness, this embodiment has no areas at all which project beyond the surface of the sound record page so that there is no one-sided thickening, no matter how the sound grooves and the associated switch-on safety elements are arranged. On the other hand, the fact that several sound grooves each are provided on one sound record page always makes it possible to find a disposition for the switch-on safety elements in the form of impressed formations which will provide a uniform distribution of the sound grooves across the surface area so that one-sided thickenings adding up in a book with many sound record pages have no disturbing effect.

It is convenient also with the sound-illustrated book according to the invention to have an adjustment perforation each associated with each sound groove, especially at either side of the switch-on safety elements, in the area of the two lower corners of a square circumscribing the sound groove. According to a modification of this embodiment of the adjuster elements, two other adjustment perforations in the area of the two upper corners of the square circumscribing the sound groove are associated with each sound groove. With all adjustment perforations located at the corners of a square, the sound reproducing apparatus may be attached in positions which are orthogonal with respect to each other.

The provision of four perforations for adjustment has the advantage that the sound record page cannot be arched or warped under the sound reproducing apparatus attached in properly aligned position. With only two perforations this could happen because the sound reproducing apparatus must be supported at least at three places of which the third one always would be on the sound record page. If the sound reproducing apparatus should become displaced slightly after attachment so as to effect engagement between the feet thereof and the adjustment perforations, thin sound recording sheetings might suffer stress.

If four adjustment perforations are provided, the sound grooves disposed on top of each other may be more closely approached to each other, with the best posibility of adjustment.

According to another embodiment of the adjuster elements the sound record pages or double pages comprise a ring of alternating adjuster embossments and adjuster engravements concentric with each sound groove. The embossments and engravements may be limited at one or both sides by a cut into the sheeting. With this design of the adjuster elements, again the embossments and engravements are effective at both sides of each sound record page. At the same time, furthermore, they can fulfill the function of the switch-on safety elements in that at least one sensing pin of the sound reproducing apparatus (switch-on safety matching element) must scan one embossment or engravement when the adjuster matching elements of the sound reproducing apparatus fit in form lock on and into the embossments and engravements.

In many cases it will be deemed particularly convenient if the sound record pages of the book are made of a transparent plastic material, in other words if sufficiently rigid transparent acoustic sheetings are used. On the other hand, better sonic quality is obtainable, particularly with thinner sound record pages, if dark plastic material, especially filled with graphite is used. Many conventional records are made of such filled plastic material. The sound record sheeting need no longer be transparent as the illustrative part of the book and the part to be read are to be found on opposite pages each.

According to another modification of the invention the sound record pages project laterally beyond the book pages and are formed like a margin index on which pages could be indicated or an alphabetic information given similar to an index. In this manner the desired sound-illustrations and the corresponding chapters of the book would be easier to find. Since the sound record pages are made of plastic sheeting which, at best, is approximately semi-rigid, their resistance is adequate for longer periods of use.

The invention will be described further, by way of example, with reference to the accompanying drawings, in which:

FIG. 1 shows an open, bound book, having a book page on the left side and a sound record page of a sound record double page on the right side;

FIG. 2 shows the sound record page of FIG. 1;

FIG. 3 is a cross sectional elevation of the sound record page along line 3—3 in FIG. 2;

FIG. 4 shows the book of FIG. 1, yet with the sound record double page turned over;

FIG. 5 shows the sound record page of FIG. 4;

FIG. 6 is a cross sectional elevation of the sound record page along line 6—6 in FIG. 5;

Figure 7:
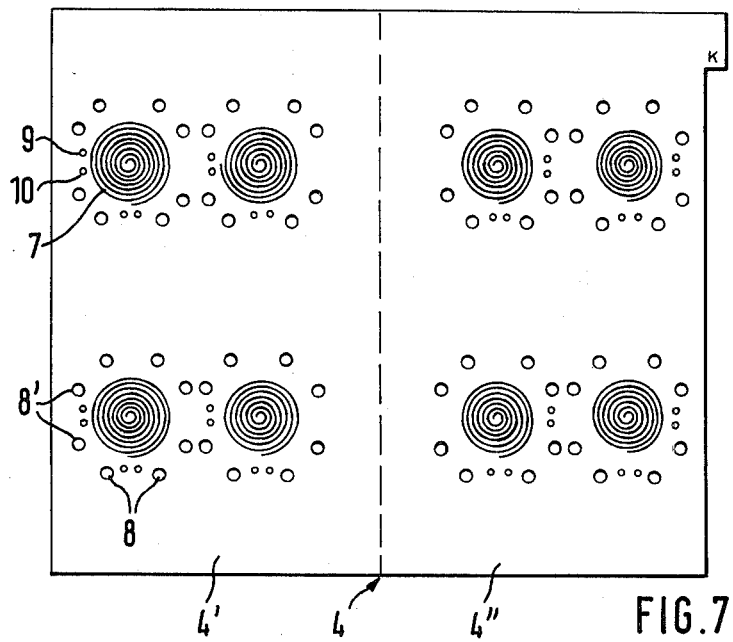
FIG. 7 is a top plan view of a sound record double page having four sound grooves on which a sound reproducing apparatus may be placed properly aligned in two orthogonal positions.

FIG. 1 shows a usual bound book 1 opened in the middle. The individual book pages 2 are disposed beneath book covers 3. The normal book page 2 having page number 202 and presenting the text and illustration of a swinging garage door is followed by a sound record double page 4 of transparent, semi-rigid plastic sheeting which can be turned over about as easily as the book pages 2 and is inserted into a quarternion of the book and bound together with the book. Each sound record page 4' and 4", respectively, projects beyond the book volume by approximately 1 cm, presenting an index lug 5 at the upper part of the right side in FIG. 1. Apart from that the book pages 2 and the sound record pages 4' and 4", respectively, have the same size.

The sound record pages 4' comprise two impressed spiral sound grooves 7 disposed one above the other symmetrically with respect to a central line 11 of the sound record pages 4' extending parallel to the back of the book and with respect to central lines 11' extending parallel to the upper book edge. Adjustment perforations 8 embodied by holes extending from one side to the other are located at the corners of a square imagined as circumscribing each sound groove 7. The upper adjustment perforations 8 of the lower sound groove 7 at the same time are the lower adjustment perforations of the upper sound groove 7. It is not necessary that the design be such as described above.

Switch-on safety elements embodied by an upwardly protruding embossment and an adjacent, downwardly depressed or setback engravement 10 are disposed between the respective lower adjustment perforations 8 and those close to the margin of the page. These embossments and engravements are scanned by sensing pins of the sound reproducing apparatus which is placed on the book page with its feet to engage in the adjustment perforations 8. The sound reproducing apparatus cannot be switched-on unless the sensing pins bear on the embossment or engravement. Two more switch-on safety embossments and engravements 9 and 10, respectively, are located at both sides of the central lines 11' of the sound grooves 7 which are orthogonal to the central line 11 extending parallel to the back of the book, and each facing the outer margin of the sound record page 4' so that the sound reproducing apparatus may be attached laterally if this provides a better planar position of the pages in the region of the switch-on safety elements, which is the case close to the first and last pages of the book.

The bound book according to FIG. 4 shows the sound record page 4' provided with page number 203 in FIG. 1 and the other sound record page 4" turned over to the left so that the backside carrying page number 206 faces the reader. It also carries sound grooves 7' for sound illustration of the right book page which carries page number 207. The sound grooves 7' are positioned exactly opposite the sound grooves 7 of sound record page 203 so that they have a common middle on the central line 11. Outside of the sound groove the adjustment perforations 8 are visible also on page number 206 of the sound record page 4". Here, however, the switch-on safety elements 9 and 10 of the sound record page number 203 are reversed laterally. At the left there is the downwardly protruding engravement 10 and to the right thereof there is the upwardly protruding embossment 9. These relationships will become apparent from the cross sectional presentations of FIGS. 3 and 6. Upon turning over the sound record pages 4' and 4", therefore, the sound grooves 7' on the backside thereof can be tracked by means of a sound reproducing apparatus. The safety functions again are fulfilled by the adjustment perforations 8, as far as properly aligned attachment is concerned, and by the switch-on safety elements 9 and 10, as far as switch-on upon proper alignment is concerned. Each embossment of a front page has become an engravement of the back page. As both sides of the acoustic sheeting may be impressed with sound grooves opposite each other as on a record disc, the costs of material and manufacture of the sound record double pages 4 to be bound in the book are reduced quite considerably. The novel design of the book makes it less thick than before in spite of the great number of sound grooves included.

Figure 8:
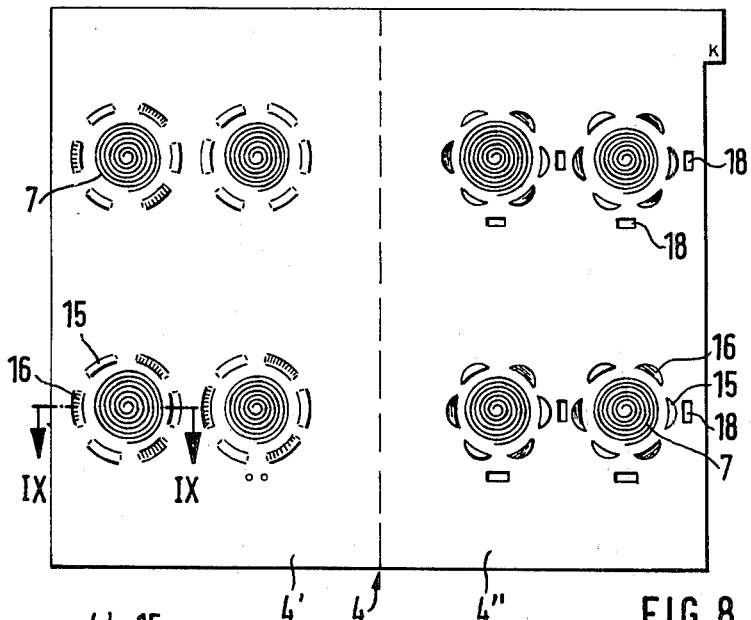
FIG. 8 is a top plan view of a sound record double page having common adjuster elements and switch-on safety elements.
Figure 9:
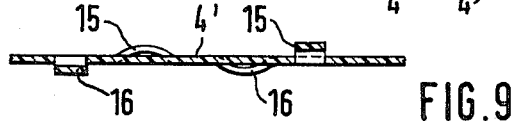
FIG. 9 is a partial cross sectional elevation of the adjuster elements and switch-on safety elements along line 9—9 in FIG. 8.

FIGS. 7 and 8 each show an unfolded sound record double page 4 consisting of a left sound record page 4' and a right sound record page 4". In the embodiment according to FIG. 7 each side comprises four sound grooves 7. It is quite possible to move the sound grooves closer together so that at least six sound grooves can be taken up by each page. The adjustment perforations 8 below and above the sound grooves are separated from the adjustment perforations 8' at both sides of the sound grooves. This means that the adjustment perforations 8 cannot be used when the sound reproducing apparatus is attached laterally; then the lateral perforations 8' are used instead. This design is necessary if the feet of the sound reproducing apparatus serving as adjuster matching elements are closer together. On the other hand, adjustment again is provided by the four feet of the sound reproducing apparatus in order to avoid any warping of the sound record page during the alignment. Switch-on safety embossments 9 and engravements 10 are provided below each sound groove as well as laterally thereof towards the outside.

The embodiment according to FIG. 8 shows each sound groove surrounded by a ring of alternating adjuster embossments 15 and adjuster engravements 16, which ring is concentric with the middle of the sound groove. On the left sound record page 4' the embossments are limited radially inwardly and outwardly with respect to the center by cuts, whereas the embodiment shown of the right sound carrier page 4" has the embossments and engravements 15 and 16 limited by cuts only at the side facing the center of the sound groove, while they merge directly into the sound carrier page 4" at the outer side. In this case, the sound reproducing apparatus is provided at its underside with corresponding adjuster matching elements for formlock engagement over and into the embossments and engravements. In at least one of these adjuster matching elements a sensing pin is provided to scan an embossment 16 or an engravement 15. If such sensing pins are provided in two feet, it is convenient to use one for scanning an embossment 16 and the other one for scanning an engravement 15.

As shown in the right half of FIG. 8, the switch-on safety element may also be embodied by a microprism area which is impressed below the sound groove and laterally thereof, facing the margin of the page, and adapted to be scanned photoelectrically. Microprism areas are known in connection with focussing means of cameras.

What I claim is:

1. A sound-illustrated, bound book, comprising sound record areas in the form of a spiral sound groove each and, associated with individual printed book pages, and adjuster elements associated with the sound groove for a sound reproducing apparatus attachable in aligned position for interaction with said adjuster elements by adjuster matching elements provided at its underside,
   wherein the sound grooves with the adjuster elements are provided on separate sound record double pages of plastic material bound in the book and inserted into the quaternia thereof and the adjuster elements are arranged symmetrically with respect to a central axis of the sound grooves.

2. A sound-illustrated, bound book, comprising sound record areas in the form of a spiral sound groove each and associated with individual printed book pages, and, associated with the sound groove, adjuster elements and switch-on safety elements for a sound reproducing apparatus attachable in aligned position for interaction with said elements by adjuster matching elements provided at its underside and switch-on safety matching elements,
   wherein the sound grooves with the adjuster elements and switch-on safety elements are provided on separate sound record double pages of plastic material bound in the book and inserted into the quaternia thereof and the adjuster elements and the switch-on safety elements are arranged symmetrically with respect to a central axis of the sound grooves.

3. The book as claimed in claim 1,
   wherein the adjuster elements are disposed symmetrically with respect to two orthogonal central axes passing through the center of the sound grooves.

4. The book as claimed in claim 2,
   wherein the adjuster elements and the switch-on safety elements are disposed symmetrically with respect to two orthogonal central axes passing through the center of the sound grooves.

5. The book as claimed in claim 1 or 3, wherein the sound grooves at both sides of each sound record page are disposed directly opposite each other having the same center, and in that the adjuster elements are arranged to be in common for the oppositely disposed sound grooves.

6. The book as claimed in claim 2 or 4,
   wherein the sound grooves at both sides of each sound record page are disposed directy opposite each other having the same center, and in that the adjuster elements and the switch-on safety elements are arranged to be in common for the oppositely disposed sound grooves.

7. The book as claimed in claim 2 or 4,
   wherein the switch-on safety elements are embodied by an upwardly protruding embossment and a downwardly protruding engravement disposed close to said embossment and that they are shared by the two oppositely disposed sound grooves.

8. The book as claimed in claim 2 or 4,
   wherein the switch-on safety elements are embodied by an impressed microprism area adapted to be scanned photoelectrically.

9. The book as claimed in claim 1 or 2, wherein as adjuster elements an adjustment perforation each is associated with each sound groove in the area of the two adjacent corners of a square circumscribing the sound groove.

10. The book as claimed in claim 9,
    wherein two further adjustment perforations in the area of the other two corners of the square circumscribing the sound groove are associated with each sound groove.

11. The book as claimed in claim 1 or 2,
    wherein as adjuster elements the sound record double pages comprise a ring of alternating adjuster embossments and adjuster engravements concentric with each sound groove.

12. The book as claimed in any of claims 1 to 4,
    wherein the sound record double pages of the book are made of transparent plastic material.

13. The book as claimed in any of claims 1 to 4,
    wherein the sound record double pages of the book are made of dark plastic material.

14. The book as claimed in claim 13,
    wherein the sound record double pages of the book are made of dark plastic material filled with graphite.

15. The book as claimed in any of claims 1 to 4,
    wherein the sound record double pages project laterally beyond the book pages and are formed like a margin index.

16. The book as claimed in any of claims 1 to 4,
    wherein the sound grooves are provided at one side only of the sound record double page.

17. The book as claimed in claim 6 wherein the switch-on safety elements are embodied by an upwardly protruding engravement disposed close to said embossment and that they are shared by two oppositely disposed sound grooves.

18. The book as claimed in claim 6 wherein the switch-on safety elements are embodied by an impressed microprism area adapted to be scanned photoelectrically.

* * * * *